US 6,547,298 B2

(12) United States Patent
Sotiroff et al.

(10) Patent No.: US 6,547,298 B2
(45) Date of Patent: Apr. 15, 2003

(54) RECONFIGURABLE INTERMEDIATE PANEL FOR USE IN A VEHICLE

(75) Inventors: John Andrew Sotiroff, Villa Hills, KY (US); Roch Joseph Tolinski, Howell, MI (US); Charles Berry Hopson, Lebanon, TN (US); George Rene Chene, Sterling Heights, MI (US); Simon Blair Dobson, Folkstone (GB); Enrico Fin, Lake Orion, MI (US)

(73) Assignee: Meritor Light Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/915,759

(22) Filed: Jul. 26, 2001

(65) Prior Publication Data

US 2002/0043811 A1 Apr. 18, 2002

Related U.S. Application Data

(60) Provisional application No. 60/220,712, filed on Jul. 26, 2000.

(51) Int. Cl.⁷ .................................................. B60R 5/02
(52) U.S. Cl. .................... 296/24.1; 296/26.09; 280/748; 410/129
(58) Field of Search ......................... 296/24.1, 26.08, 296/26.09, 85, 65.16, 51, 146.16, 190.08, 190.11, 183; 280/748; 410/129, 130

(56) References Cited

U.S. PATENT DOCUMENTS

| | | | | |
|---|---|---|---|---|
| 2,502,538 A | * | 4/1950 | Stark | 296/85 |
| 3,015,515 A | * | 1/1962 | Halstead et al. | 296/24.1 |
| 3,419,304 A | * | 12/1968 | Sangimino | 160/241 |
| 3,441,309 A | * | 4/1969 | Halstead et al. | 296/24.1 |
| 4,015,875 A | * | 4/1977 | Setina | 296/24.1 |
| 4,035,014 A | * | 7/1977 | Sellers | 296/24.1 |
| 4,119,341 A | * | 10/1978 | Cook | 296/146.16 |
| 4,202,577 A | * | 5/1980 | Breitschwerdt et al. | 280/749 |
| 4,588,223 A | * | 5/1986 | Ledenyi | 160/84.06 |
| 4,621,856 A | * | 11/1986 | McKenzie | 280/749 |
| 4,659,136 A | * | 4/1987 | Martin et al. | 105/377.09 |
| 4,688,842 A | * | 8/1987 | Arbenius | 296/24.1 |
| 4,793,099 A | * | 12/1988 | Friese et al. | 296/146.16 |
| 4,919,467 A | * | 4/1990 | Guimelli | 296/24.1 |
| 5,702,143 A | * | 12/1997 | Shimazaki | 160/24 |
| 5,931,527 A | | 8/1999 | D'Onofrio et al. | |
| 6,059,313 A | * | 5/2000 | Coogan et al. | 280/749 |
| 6,176,535 B1 | | 1/2001 | Chaloult et al. | |
| 6,217,096 B1 | * | 4/2001 | Koiwa et al. | 296/24.1 |
| 6,260,905 B1 | * | 7/2001 | Wagner | 296/146.16 |
| 6,474,173 B2 | * | 11/2002 | Ruck et al. | 296/24.1 |
| 6,474,725 B2 | * | 11/2002 | Sotiroff et al. | 296/190.11 |
| 2002/0008396 A1 | * | 1/2002 | De Gaillard | 296/26.09 |

OTHER PUBLICATIONS

Publication regarding Chevy Avalanche Adaptable Interior, entitled "What Makes Avalanche Avalanche.", Jul. 2001.

* cited by examiner

*Primary Examiner*—D. Glenn Dayoan
*Assistant Examiner*—Patricia Engle
(74) *Attorney, Agent, or Firm*—Carlson, Gaskey & Olds

(57) ABSTRACT

A reconfigurable intermediate panel provides the capability of reconfiguring the interior space of a vehicle. A first panel portion is moveable in the vehicle between various locations. A second panel portion is supported for movement with the first panel portion and for movement relative to the first panel portion. By selectively extending the second panel portion relative to the first panel portion, the vehicle interior space may be selectively divided and provides isolated vehicle compartments.

17 Claims, 3 Drawing Sheets

RECONFIGURABLE INTERMEDIATE PANEL FOR USE IN A VEHICLE

CROSS REFERENCE TO RELATED APPLICATIONS

This application claims priority to the U.S. Provisional Application having Ser. No. 60/220,712, which was filed on Jul. 26, 2000.

BACKGROUND OF THE INVENTION

This invention generally relates to a reconfigurable panel assembly that is useful for altering the configuration of a vehicle interior space and cargo-carrying capacity.

Modem day vehicles typically offer multiple configurations of accommodation, which is dependent on the position of a second row of seats. For example, station wagons and sport utility vehicles typically include a second row of seats that optionally folds down into a cargo-carrying position. Fold down seats have been used for many years and provide the advantage of increasing the ability to carry a wider variety of cargo within a vehicle.

One disadvantage with such vehicles is that any cargo placed within the rear portion of the vehicle is not adequately isolated from the driver or passenger in the forward portion of the vehicle. One attempt at addressing this problem has been to redesign body styles such as the hybrid sport utility pickup style vehicle that has recently been introduced. While a different body style provides different cargo-carrying capacities, there are disadvantages associated with having to manufacture and offer too many types of vehicles to address various individuals' tastes or needs.

There is a need to be able to reconfigure the capacities within a vehicle without losing the advantages of accepted vehicle design. One challenge associated with providing the ability to reconfigure a vehicle interior is the challenge of adequately closing off the cargo-carrying section of the vehicle from the interior occupied by a driver and one or more passengers. A particular challenge associated with such isolation is to not only isolate the cargo from the remainder of the interior but to also seal off the environment in some situations. The issue is further complicated when one tries to provide various interior configurations for a given vehicle.

It is further desirable to provide a solution to this problem that does not require a vehicle owner to have various components that must be selectively removed and stored outside of the vehicle. Limited storage space and convenience would inhibit most consumers from purchasing such a vehicle.

Prior to this invention no one has adequately addressed the need for reconfiguring a vehicle's interior space or cargo-carrying capacity while simultaneously effectively isolating the different compartments of the vehicle from each other or from the environment as needed. This invention addresses those needs while avoiding the shortcomings and drawbacks of prior attempts.

SUMMARY OF THE INVENTION

In general terms, this invention is a vehicle panel assembly that is useful for reconfiguring the interior space of the vehicle and providing different cargo-carrying capacities or configurations.

A panel assembly designed according to this invention includes a first panel portion that is moveable relative to the vehicle body from a first location to a second location. In each location, the first panel portion preferably has essentially the same orientation. A second panel portion is supported for movement with the first panel portion between the different locations. The second panel portion is also moveable relative to the first panel portion. In one example, the second panel portion is a window that is selectively extended away from the first panel portion to close off one vehicle compartment from another.

A panel assembly designed according to this invention is useful for isolating enclosed interior spaces or for isolating an interior space from an open cargo-carrying space such as a truck bed.

The first panel portion preferably has a seal associated with at least three sides of the panel to provide a seal between the panel and adjacent structures within the vehicle body or cargo-carrying area. The second panel preferably is received within a channel at each of the locations where the panel assembly may be positioned. The channel for receiving the second panel preferably provides a seal to isolate one vehicle compartment from another. The channel preferably also provides support to the second panel in an extended position.

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENTS

Figure 1:
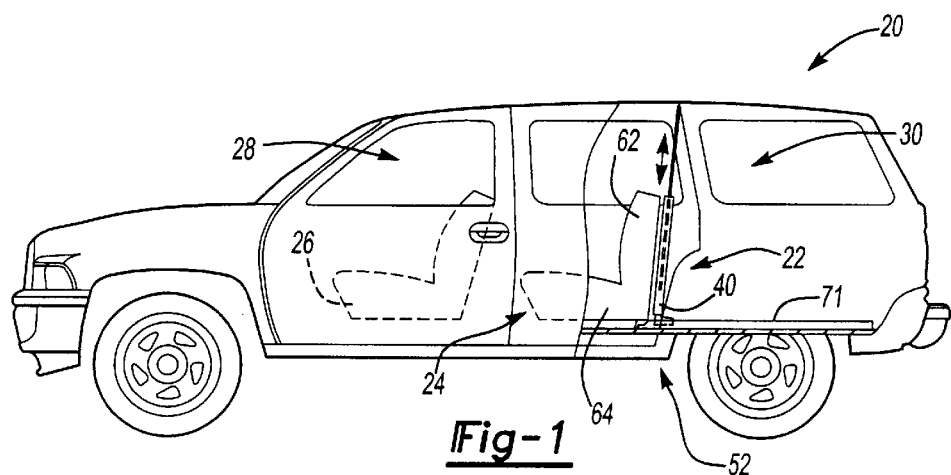
FIG. 1 schematically illustrates an example vehicle with an example moveable panel assembly designed according to this invention.
Figure 2:
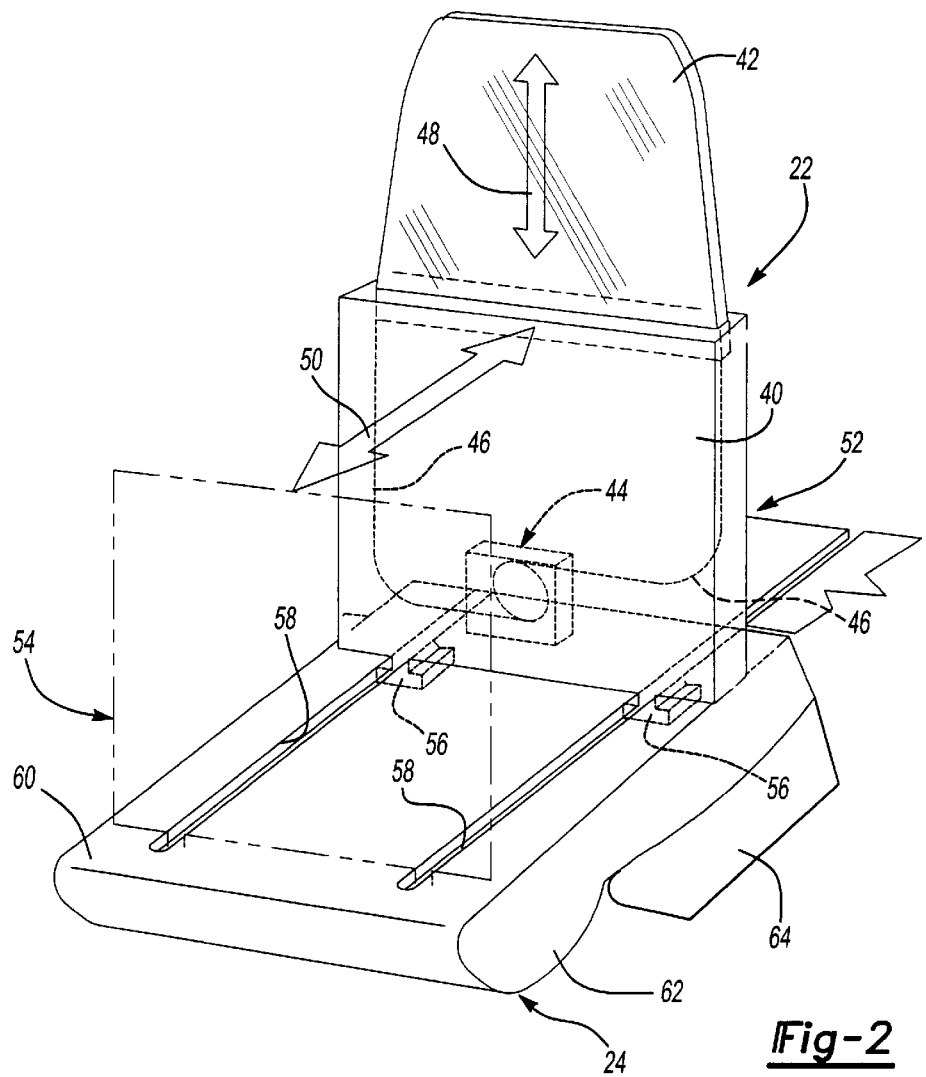
FIG. 2 schematically illustrates selected features of the moveable panel assembly of the embodiment of FIG. 1.

A vehicle 20 includes a reconfigurable panel assembly 22 that is useful for altering the configuration of the interior space of the vehicle. The illustrated vehicle 20 is a sport utility type vehicle having a rear row of seats 24 and a front set of seats 26. The seats may be bench style or bucket style. The reconfigurable panel assembly 22 facilitates isolating a first, interior compartment 28 of the vehicle 20 from a second compartment or portion 30. By appropriately positioning and adjusting the panel assembly 22, the volume of each vehicle compartment can be altered and one compartment can be isolated from the other.

The panel assembly 22 preferably includes a first panel portion 40 that is moveable within the vehicle. A second panel portion 42 preferably is supported for movement with the first panel portion 40. The second panel portion 42 preferably also is moveable relative to the first portion 40.

In the illustrated example, the first panel portion is a solid panel that comprises metal or a rigid plastic material, or a combination of such materials. The second panel portion 42 is a clear panel, comprising automotive glass, for example. In the illustrated example, the second panel portion 42 is selectively received within the first panel portion 40. A moving mechanism 44 having push-pull cables 46, such as a known window lift mechanism, facilities moving the second panel portion 42 relative to the first panel portion as shown by the arrow 48. The moving mechanism 44 may be powered or manually operated, depending on the particular embodiment.

The panel assembly 22 preferably is moveable within the vehicle 20 as schematically shown by the arrows 50. The panel assembly 22 may be in a first location 52 or a second location 54, depending on the desires of the vehicle owner. In the first position 52, the panel assembly 22 is positioned behind the rear row of seats 24. In the other position 54 the panel assembly 22 preferably is positioned behind the first row of seats 26.

While two panel portions are illustrated and two locations are shown, this invention is not so limited. Various configurations including more than two panel portions or providing for more than two locations of the panel assembly 22 are within the scope of this invention. Given this description, those skilled in the art will be able to realize the various possibilities available when practicing this invention.

To facilitate movement of the panel assembly 22, support members 56 preferably are supported by the first panel portion 40. The support members 56 preferably are guided in tracks or grooves within the vehicle. The illustrated example includes the advantage of having tracks 58 associated with a support panel 60, which is a portion of the seat back 62 of the rear row of seats 24. The seat back 62 is foldable relative to a seat base 64 to move the seat 24 from an upright configuration into a folded configuration. When in the folded configuration, the support surface 60 provides a cargo-supporting surface that also supports the tracks 58 for guiding the support members 56 as the panel assembly 22 is moved between the positions 52 and 54 in the vehicle.

In one example, the tracks 58 are included in recesses formed in the panel 60 on the seat back 62. In another example, the tracks 58 are supported on top of the panel 60. The support members 56 and tracks 58 are shown schematically. Given this description, those skilled in the art will be able to choose appropriate components for each.

When the panel assembly 22 is in the first location 52, the first panel portion 40 preferably has a generally upright or vertical orientation within the vehicle. When the second panel portion 42 is retracted or received within the first panel portion 40, then the vehicle has a configuration where no portion of the interior is completely isolated from another. By raising or extending the second panel portion 42 relative to the first panel portion 40, the first interior compartment 28 can be strategically isolated from a second portion 30. This is particularly advantageous when transporting an animal or certain types of cargo within the rear of the vehicle.

Figure 3:
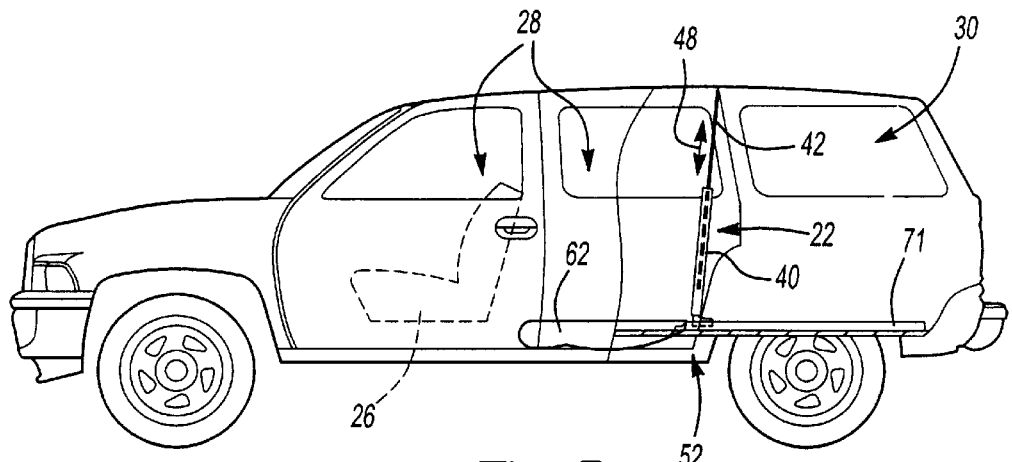
FIG. 3 schematically illustrates the vehicle of FIG. 1 with the vehicle interior configuration changed by a change in the position of a portion of the moveable panel assembly.
Figure 4:
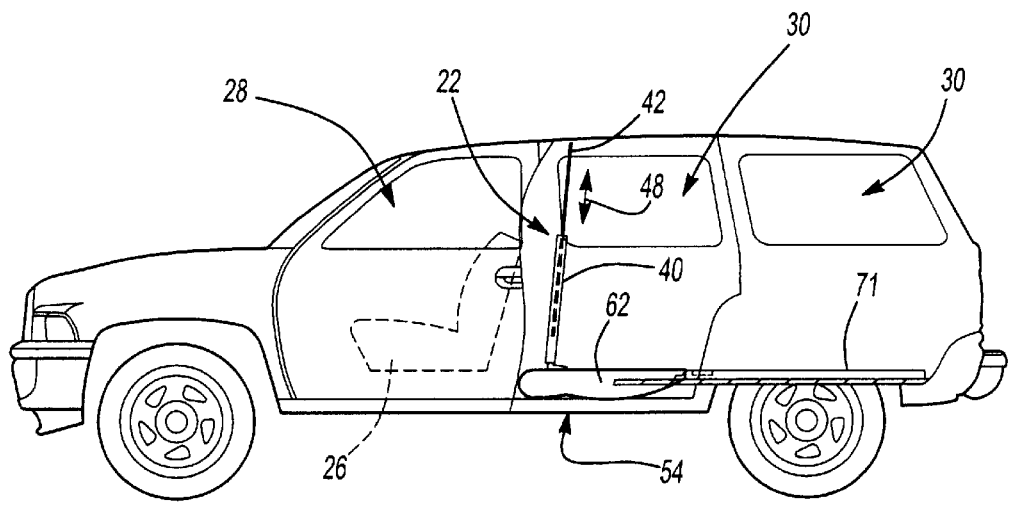
FIG. 4 schematically illustrates the vehicle of FIGS. 1 and 3 with the moveable panel assembly in another location, which provides another alteration of the vehicle interior configuration.
Figure 5:
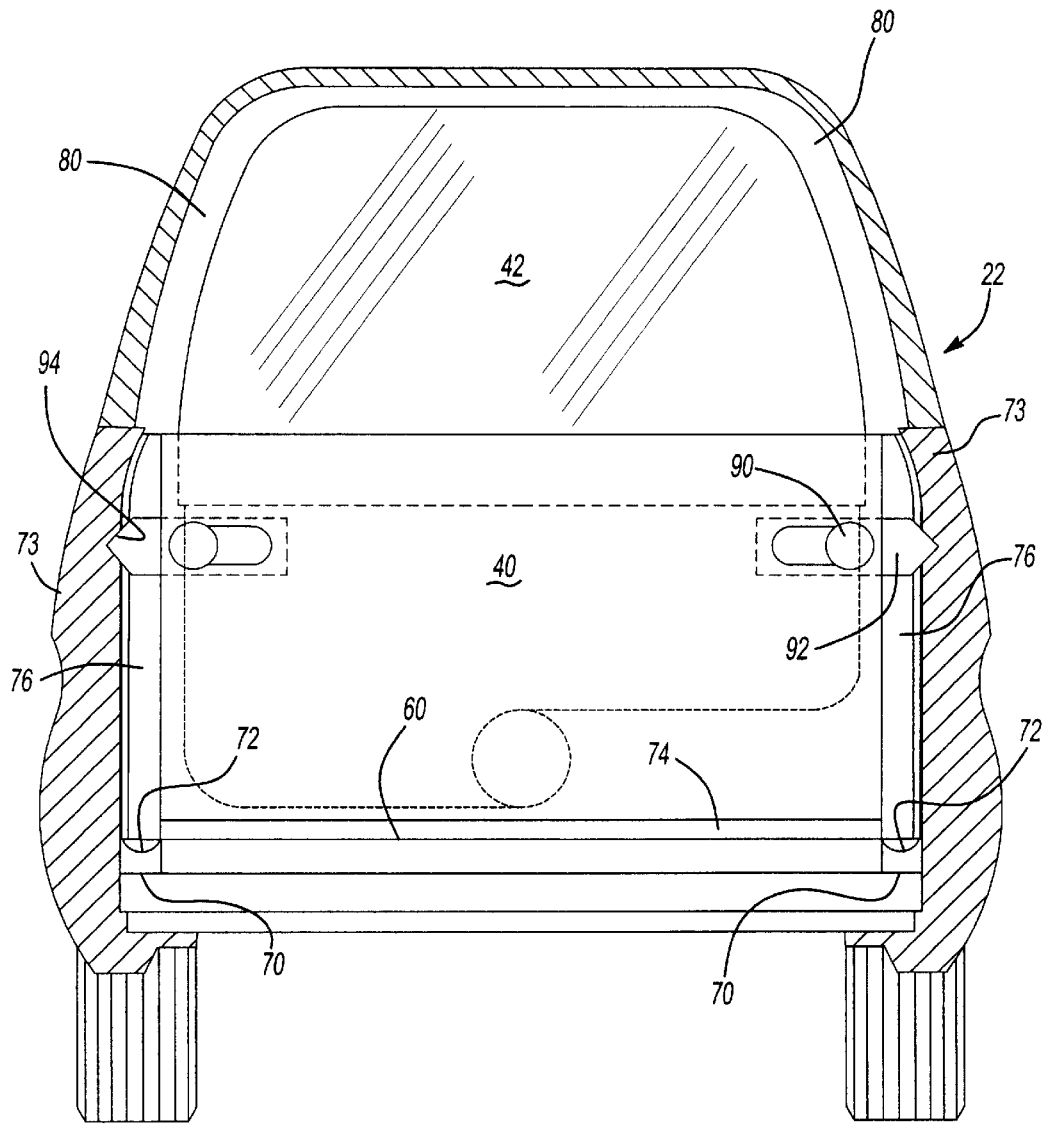
FIG. 5 schematically illustrates an example sealing arrangement and other preferred features for the example embodiment.

The preferred embodiment provides the ability to fold down the second row of seats 24 while leaving the panel assembly 22 in the first location 52 (see FIG. 3, for example). The panel assembly 22 may be moved into the second location 54 when the seat back 62 and support surface 60 are in the folded, generally horizontal position (see FIG. 4). It is preferred to have the second panel portion 42 at least partially into a retracted position while moving the panel assembly 22 within the vehicle. When the panel assembly 22 is at the desired location, the second panel portion 42 may be extended, retracted or at some intermediate position, depending on the needs of a particular situation.

When the second panel portion 42 is in a fully extended position, the panel assembly 22 preferably completely isolates a first section 28 of the vehicle interior from a second, cargo-carrying portion 30. In the illustrated examples, both sections of the vehicle are always enclosed. In other vehicles, such as hybrid pickup/sport utility vehicles, the second vehicle section 30 may be open to the environment. In such examples, the panel assembly 22 provides the added advantage of having an enclosed driver and passenger compartment 28 that is not only isolated from the cargo but also isolated from the environment to provide a pleasant driving experience.

To facilitate isolation, the panel assembly 22 preferably includes at least one seal member that provides an adequate seal to isolate the first vehicle compartment 28 from the second vehicle compartment 30. In the illustrated example, the support panel 60 preferably includes a seal 70 at each side edge of the panel 60 for sealing off an interface between the panel 60 and corresponding interior surfaces 73 on the vehicle body structure. The illustrated example includes channels 72 formed in the seal members 70. The channels 72 preferably are provided to direct any fluid that may spill or otherwise be placed upon the surface 60 within the vehicle compartment 30. The seals 70 preferably are supported with the panel 60 to move as the seat back 62 is manipulated between the upright and folded positions. Because the rear deck portion 71 of the vehicle positioned behind the rear row of seats 24 is stationary with respect to the remainder of the vehicle, conventional sealing techniques can be used for that portion of the cargo-carrying compartment 30. The same is not true of the panel 60, however, which should be moveable between the positions schematically illustrated in the figures.

The first panel portion 40 preferably includes a seal along at least three sides of the panel. A first seal member 74 seals off an interface between the first panel portion 40 and the support surface 60 when the assembly 22 is in the second location 54. The same seal closes the interface between the rear deck 71 and the panel 40 when the assembly 22 is in the first location 52. A second seal arrangement 76 preferably seals off an interface between the first panel portion 40 and the interior surfaces of the vehicle 73. The seal members 76 preferably are compression seals to provide an adequate seal between the vehicle interior or body and the panel portion 40. The interior of the vehicle or the vehicle body may be strategically configured near the locations 52 and 54 to provide better sealing characteristics.

The second panel portion preferably is received within a sealing channel 80 that is supported by the vehicle body structure 73. Such a channel may resemble a conventional channel on a vehicle door, which seals and supports a window when the window is in an upright position. The preferred embodiment includes such a channel 80 at each of the locations 52 and 54 so that complete isolation of one vehicle compartment 28 from the other vehicle compartment 30 may be readily achieved. The channel 80 also provides support for the panel portion 42 in an extended position.

The panel assembly 22 preferably includes a locking mechanism for securing the panel assembly 22 in the desired position within the vehicle. The illustrated example includes handles 90 that can be manually manipulated to move a latch member 92 into or out of an appropriate receiver 94 on the vehicle body at the locations where the panel assembly 22 may be positioned. A variety of latching or locking mechanisms may be used and those skilled in the art who have the benefit of this description will be able to select appropriate components to provide a secure arrangement.

The panel assembly 22, therefore, provides the ability to reconfigure the interior space of the vehicle 20. By moving the panel assembly 22 between the locations 52 and 54 and selectively moving the second panel portion 42 relative to the first panel portion 40, the volume of the vehicle compartments 28 and 30 are selectively altered and selectively isolated from each other.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following

We claim:

1. An intermediate body panel assembly for use in a vehicle, comprising:
    a first panel portion that is moveable relative to the vehicle body from a first location where the first panel portion is in a first generally vertical plane to a second location where the first panel portion is in a second generally vertical plane that is parallel to the first plane; and
    a second panel portion supported for movement with the first panel portion and for movement relative to the first panel portion wherein the second panel portion moves from a first position where the second panel portion is generally aligned with the first panel portion to a second position where the second panel portion is at least partially extended away from the first panel portion wherein the second panel portion is generally parallel to the first panel portion in each of the first and second positions.

2. The assembly of claim 1, wherein the second panel portion is at least partially received within the first panel portion when the second panel portion is in the first position.

3. The assembly of claim 1, including a moving mechanism for moving the second panel portion relative to the first panel portion and wherein the moving mechanism is supported by the first panel portion.

4. The assembly of claim 1, wherein the second panel portion is clear.

5. A vehicle, comprising:
    a first, interior section;
    at least one seat in the first section for supporting at least a driver of the vehicle;
    a second section adjacent the first section; and
    a moveable panel assembly that is moveable to a plurality of locations in the vehicle such that when the moveable panel assembly is in a first location, there is a first distance between the first section seat and the moveable panel assembly, and when the moveable panel assembly is in a second location, there is a second distance between the first section seat and the moveable panel assembly, the moveable panel assembly having a first panel portion and a second panel portion that is moveable with the first panel portion and moveable relative to the first panel portion to selectively close off the first section from the second section, including at least one seal member associated with the first panel portion for sealing off an interface between the first panel portion and at least one adjacent surface on the vehicle, wherein the seal is along a lower edge of the first panel and includes a channel.

6. A vehicle, comprising:
    a first, interior section;
    at least one seat in the first section for supporting at least a driver of the vehicle;
    a second section adjacent the first section; and
    a moveable panel assembly that is moveable to a plurality of locations in the vehicle such that when the moveable panel assembly is in a first location, there is a first distance between the first section seat and the moveable panel assembly, and when the moveable panel assembly is in a second location, there is a second distance between the first section seat and the moveable panel assembly, the moveable panel assembly having a first panel portion and a second panel portion that is moveable with the first panel portion and moveable relative to the first panel portion to selectively close off the first section from the second section, including at least one seal member associated with the first panel portion for sealing off an interface between the first panel portion and at least one adjacent surface on the vehicle, wherein the seal is along two side edges of the first panel portion and the seal comprises a compression seal that is adapted to sealingly engage an interiorly facing surface on the vehicle near the side edges of the first panel portion when the first panel portion is in either the first location or the second location.

7. A vehicle, comprising:
    a first, interior section;
    at least one seat in the first section for supporting at least a driver of the vehicle;
    a second section adjacent the first section; and
    a moveable panel assembly that is moveable to a plurality of locations in the vehicle such that when the moveable panel assembly is in a first location, there is a first distance between the first section seat and the moveable panel assembly, and when the moveable panel assembly is in a second location, there is a second distance between the first section seat and the moveable panel assembly, the moveable panel assembly having a first panel portion and a second panel portion that is moveable with the first panel portion and moveable relative to the first panel portion to selectively close off the first section from the second section, wherein the second panel portion comprises a window and the vehicle includes a channel at the first and second locations, respectively, each channel receiving at least a portion of the second panel portion when the second panel portion is in an extended position relative to the first panel portion.

8. The vehicle of claim 7, wherein the second panel portion is supported at least partially within the first panel portion.

9. The vehicle of claim 7, including a track assembly supported in the second section of the vehicle, the track assembly guiding the first panel portion when the first panel portion is moved between the first and second locations.

10. A vehicle, comprising:
    a first, interior section;
    at least one seat in the first section for supporting at least a driver of the vehicle;
    a second section adjacent the first section; and
    a moveable panel assembly that is moveable to a plurality of locations in the vehicle such that when the moveable panel assembly is in a first location, there is a first distance between the first section seat and the moveable panel assembly, and when the moveable panel assembly is in a second location, there is a second distance between the first section seat and the moveable panel assembly, the moveable panel assembly having a first panel portion and a second panel portion that is moveable with the first panel portion and moveable relative to the first panel portion to selectively close off the first section from the second section, including a track assembly supported in the second section of the vehicle, the track assembly guiding the first panel portion when the first panel portion is moved between the first and second locations, including a seat positioned at least partially in the second section and wherein the seat has a seat back that is foldable between an upright position and a generally horizontal position and wherein a surface on the seat back supports the track assembly such that the first panel portion is moveable along the track assembly when the seat back is in the generally horizontal position.

11. The vehicle of claim 10, including a plurality of recesses in the seat back surface that receive support members associated with the first panel portion as the first panel portion is moved relative to the seat back.

12. A vehicle, comprising:

a first, interior section;

at least one seat in the first section for supporting at least a driver of the vehicle;

a second section adjacent the first section;

at least one support panel that comprises a seatback that is selectively moveable between a generally horizontal position and an upright, passenger accommodating position, the support panel being in the second section that has a cargo supporting surface facing upward;

a moveable panel assembly that is moveable to a plurality of locations in the vehicle such that when the moveable panel assembly is in a first location, the first section has a first volume and when the moveable panel assembly is in a second location, the first section has a second volume; and a track assembly supported on the support panel that guides the moveable panel as the moveable panel assembly is moved between the first and second locations.

13. The vehicle of claim 12, wherein the moveable panel assembly includes a first panel portion and a second panel portion that is moveable with the first panel portion and moveable relative to the first panel portion to selectively close off the first section from the second section.

14. The vehicle of claim 12, wherein the track assembly is at least partially within the seat back and the cargo supporting surface includes a plurality of recesses that receive support members associated with the moveable panel assembly.

15. The vehicle of claim 12, wherein the support panel includes at least one seal member that seals off an interface between at least two sides of the support panel and an adjacent surface on the vehicle.

16. The vehicle of claim 12, including at least one seal that seals off an interface between the support panel and the moveable panel assembly.

17. The vehicle of claim 12, including at least one seal that seals off an interface between at least two sides of the moveable panel assembly and adjacent portions of the vehicle.

* * * * *